June 18, 1935.  C. GOTTWALD ET AL  2,005,704

CONDUIT

Filed March 25, 1933

INVENTORS
Christian Gottwald and Harvey R. Haugood
BY
Haugood and Van Horn
ATTORNEYS Patented June 18, 1935

2,005,704

UNITED STATES PATENT OFFICE 2,005,704

CONDUIT

Christian Gottwald, Cleveland Heights, and Harvey R. Hawgood, Cleveland, Ohio, assignors to The Ric-wiL Company, Cleveland, Ohio, a corporation of Ohio Application March 25, 1933, Serial No. 662,771

2 Claims. (Cl. 137—75)

This invention relates to conduits and more particularly to conduits adapted for subterranean installation and for the conducting of hot or cold fluids, such as steam, refrigerant mixtures and the like.

Heretofore, conduit systems for the conveying of steam, hot water and other heated fluids, or for conveying cool fluids, such as used in refrigeration plants and the like, have been constructed, which consist of one or more pipes for conducting the fluid, these being positioned within a casing. The space between the pipes and casings contain heat insulating material or the air within the space is utilized as a heat insulation, and such systems have been installed underground and supported upon or above drainage tiles or the like.

A good example of such installation is shown in my prior Patent No. 1,681,731, issued August 21, 1928. From this patent, it will be noted that the casing surrounding the steam line is made of cylindrical sections, resembling ordinary sewer tile, which are split longitudinally into two semi-cylindrical halves, the lower portion of each section being installed upon a generally trapezoidal base drain, and the upper section being replaced upon the lower section after the pipe and insulating material and pipe supports have been installed within the lower portion. In order to seal the line of juncture between the upper and lower portions, the section may be provided adjacent this line with ribs or flanges which form a channel-shaped recess for the reception of cement or other sealing material.

While such ribs greatly facilitate the sealing of the joints along the sides of the sections, their provision introduces certain difficulties into the manufacture of the sections.

These sections are generally made from clay, extruded in the manner used in producing ordinary tiles, generally being provided with a glaze, and then fired or baked. Clay such as used for articles of this type contains a high percentage of moisture. If this moist clay is formed into a cylindrical article having concentric inner and outer surfaces throughout, upon drying the material will shrink, decreasing in diameter and length, but this shrinkage will be uniform throughout, and if the article originally molded consisted for instance of a hollow right cylinder, the dried article will be a similar cylinder of somewhat smaller dimensions.

If, however, such cylinder be provided, as molded, with a thickened portion, obviously the quantity of moisture within the thickened portion for a given arcuate extent of the cylinder will be greater than that within a corresponding arcuate extent of the thinner portion. This greater quantity of moisture will produce, in evaporating, a different rate of shrinkage for the thickened portion of the article than for the thinner portion.

If the original article consisted of a right cylinder, this difference in shrinkage is inclined to distort the article by varying its cross-section from a true circle, and by bending its axis into a curve.

Similarly, during firing and cooling the expansions and contractions set up within the article will be different in the thicker parts than in the thinner, and considerable further distortion is therefore experienced.

Also, with a casing such as illustrated in my above mentioned patent and made of ceramic material, the casing is of course strongest in its resistance to compression, and therefore when loaded to the point of failure, fractures occur at the points which are subjected to bending stresses, namely at the extreme top and bottom of the section.

It is an object of the present invention to eliminate the disadvantages of prior types of conduit construction, while retaining the advantages of these prior types.

Another object is to provide an improved conduit section having internal drainage means.

Another object is to provide an improved conduit section, including a vent means.

Other objects will hereinafter appear.

The invention will be better understood from the description of several practical embodiments thereof, illustrated in the accompanying drawing, in which.

Figure 1:
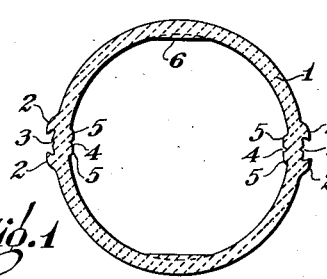
Figure 1 is a transverse sectional view of one form of conduit section embodying the invention.

In Figure 1, a conduit section is shown of generally tubular shape, consisting of a cylindrical wall 1, provided along opposite edges with ribs or flanges 2, between which sealing material may be inserted, the space between the flanges being of generally dovetailed shape for the secure holding of this sealing material. Between the flanges, the sides of the section are decreased in thickness by grooves or the like 3 and 4, on the exterior and interior of the sections respectively, these being for the purpose of weakening the section so that it may be split lengthwise along the grooves. The ribs 2 and the smaller strengthening flanges 5 on the interior of the conduit are the parts which prevent the symmetry of the section which would be desired for greatest convenience in manufacture, as above pointed out.

To compensate for these ribs, flattened or segmental thickened portions 6 have been provided intermediate the ribs, these thickened portions, in practice, coming at the extreme top and bottom of the section at the point where it is most subjected to bending stresses, and, as will be seen, increase the moment of inertia at these points, greatly strengthening the section while adding very little material to it. The dotted lines indicate the cylindrical surface of a section of uniform thickness. The segmental portions also cause the two points intermediate the ribs to dry, contract, and expand at substantially the same rate as do the parts of the section adjacent the ribs, thus preventing or reducing distortion, and facilitate manufacture.

Figure 2:
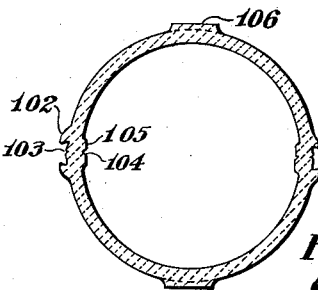
Figures 2, 3 and 4 are similar views of other embodiments of the invention.

In Figure 2, the thickened portions 106 of the section have been placed on the exterior of the cylindrical section, rather than on its interior, but are still defined by plane surfaces, as shown.

Figure 3:
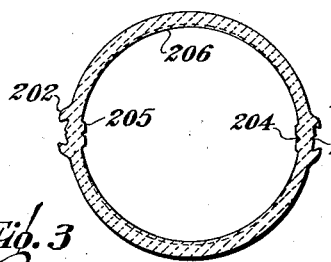

In Figure 3, the thickened portion 206 has a generally crescent-shaped cross section, merging more smoothly into the older style cylindrical inside surface.

Figure 4:
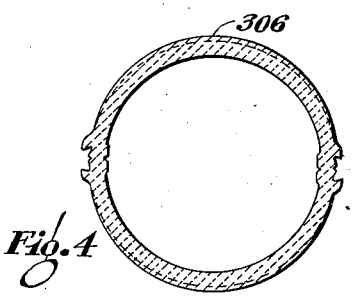

In Figure 4, a more or less similar crescent-shaped reinforcement 306 has been added upon the exterior of the section.

Figure 5:
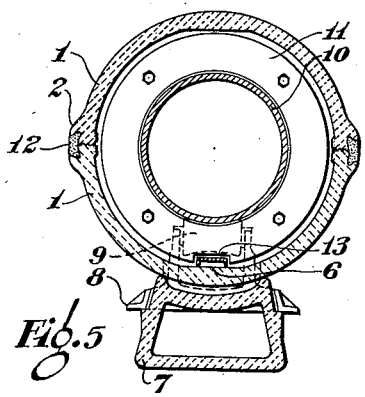
Figure 5 is a transverse sectional view of a completely assembled conduit, using the conduit section of Figure 1.

Figure 5 illustrates the manner in which the sections of Figure 1 are associated with other parts in actual use, and from this it will be seen that the bottom halves of the sections 1 are supported upon a trapezoidal base drain 7 of ceramic material. A pipe support, consisting of a saddle-like lower portion 8, is likewise mounted on the base drain and carries a roller 9, upon which rests a pipe 10. This pipe is shown as coaxial with the casing and maintained away from the same by a partition plate 11 secured to the support. Cement for sealing the line of juncture between the halves of the casing section is indicated at 12 and within a space between the ribs 2.

An inverted channel 13 of metal or the like passes beneath roller 9, with its open side toward the lower thickened reinforcement portion 6 of the casing section. The space between the section 1 and pipe 10 is filled with heat insulating material.

The operation of this installation is as follows. Pipe 10 may, of course, expand or contract, rolling upon rollers 9, the expansion and contraction being taken up by a suitable expansion joint or the like (not shown). If any moisture finds its way within the casing 1, this moisture will condense and flow down to the bottom of the interior of the casing. At this point, it will pass within the hollow of a channel member 13, within which it may run to any outlet, such as a manhole or the like, and its presence at such outlet will indicate to an observer that a leak in either casing 1 or pipe 10 has occurred.

Figure 6:
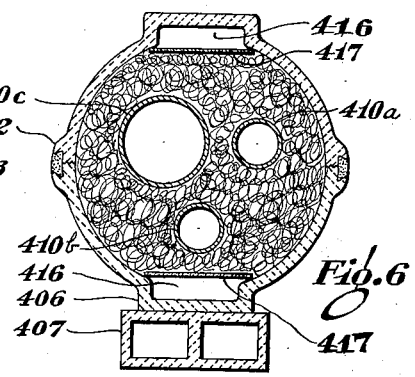
Figure 6 is a similar view showing another type of conduit section.

In Figure 6, the casing sections are shown as having externally flattened reinforcing portions intermediate the ribs 402, which flattened portions are substantially parallel by the configuration of the interior of the section, forming trough-like spaces 416 within the conduit. The lower halves of the casing sections may rest upon rectangular base drain tiles 407, making it possible to use a simpler and cheaper form of base drain than that shown in Figure 5.

Pieces of slate or the like 417 overlie the recesses 416 and confine the heat insulating material surrounding pipes 410a, 410b and 410c within the casing and prevent it from filling these recesses. The pipes within the casing may be supported by metallic partitions perforated for their passage and provided with rollers or the like to facilitate their movement upon expansion. In this instance, the lower recess 416 serves as a drain corresponding to the recess within channel 13 in Figure 5, while the upper recess 416 serves as a vent through which steam or the like may pass from the conduit to a manhole.

With this form of construction, one inspecting a manhole can tell instantly whether a given conduit has a leak admitting water to its interior, or a leak allowing steam or the like to escape from any of the pipes therein.

Figure 7:
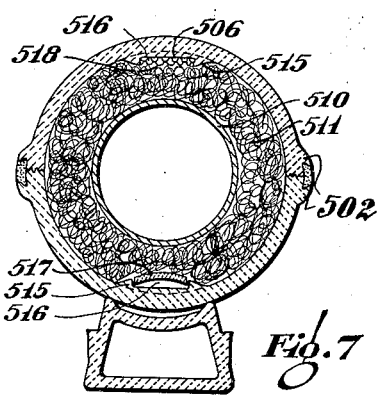
Figure 7 is a view similar to Figures 5 and 6, showing still another form of the conduit section.

Figure 7 shows a casing section in which the thickened portions 506 are bounded by ribs 515 interiorly of the section. These ribs, together with thickened portions 506, are proportioned to compensate in manufacture for the ribs 502, and to provide the increased strength necessary at the top and bottom of the conduit section, and providing between the ribs, spaces 516 corresponding, in a way, to the spaces 416 in the last described figure.

Within the casing section is a steam pipe 510 and between it and the casing heat insulated material 511, such as referred to in the preceding figures. To keep this material from filling the lower space 516, arcuate pieces 517, of tile or the like, are positioned between the ribs 515, while between the upper ribs 515 several layers of corrugated asbestos 518 or the like are provided so that the upper and lower spaces 516 provide, respectively, a longitudinally extending vent and a longitudinally extending internal drain.

While we have described the illustrated embodiments of our invention in some particularity, obviously many others will readily occur to those skilled in this art, and we do not, therefore, limit ourselves to the precise details shown and described herein, but claim as our invention all embodiments, variations and modifications thereof coming within the scope of the sub-joined claims.

We claim:

1. A ceramic conduit section of generally tubular form having two pairs of ribs arranged substantially diametrically opposite each other and two thickened portions intermediate said pairs of ribs and arranged substantially diametrically opposite each other, the cross-sectional area of said ribs being substantially equal to that of said thickened portions whereby changes in size of parts of the section during manufacture are substantially equalized.

2. A ceramic article comprising a tubular body of substantially uniform thickness throughout the major portion of its extent, two excrescences each including a pair of axially extending ribs arranged diametrically opposite each other, each pair of ribs defining a recess, and two axially extending excrescences intermediate said ribs, the ribs and second mentioned excrescences being substantially equal in cross-section, the second mentioned excrescences being arranged diametrically opposite each other substantially midway between the recesses.

CHRISTIAN GOTTWALD.
HARVEY R. HAWGOOD.